May 3, 1966    R. J. KOERNER    3,249,915
METHOD AND APPARATUS FOR VEHICLE DETECTION
Original Filed May 31, 1963    4 Sheets-Sheet 1
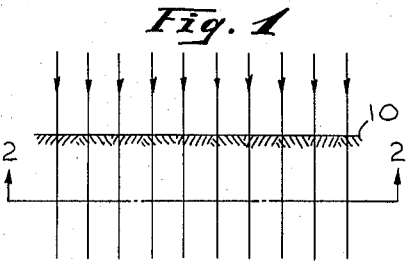
Fig. 1
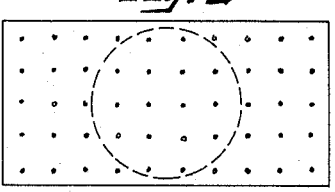
Fig. 2
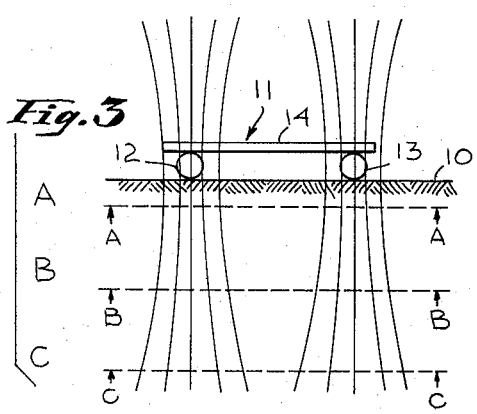
Fig. 3
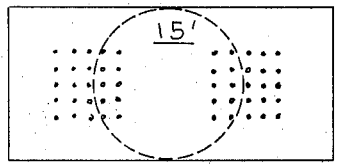
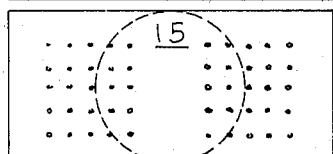
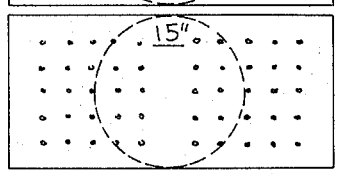
Fig. 4
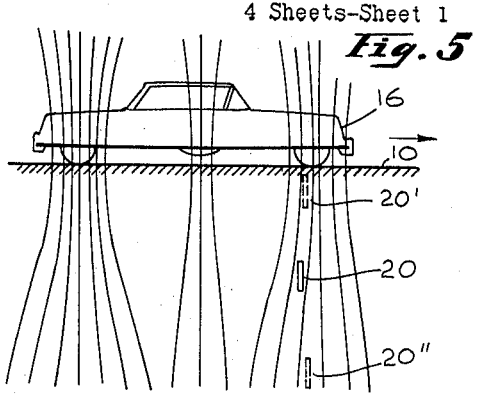
Fig. 5
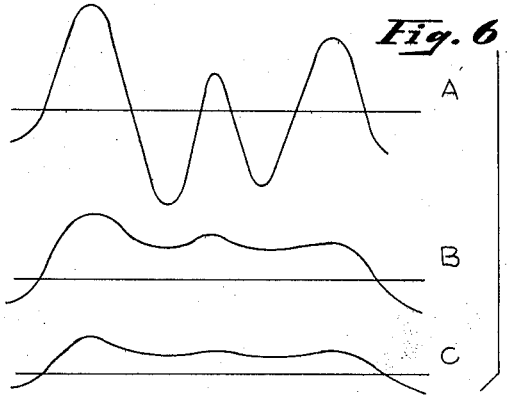
Fig. 6
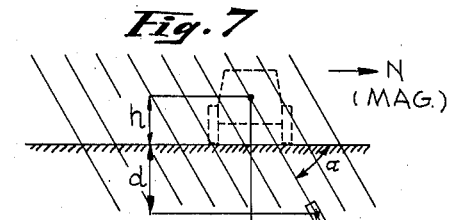
Fig. 7
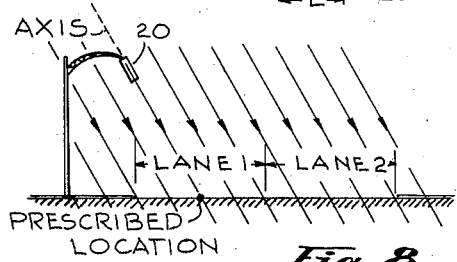
Fig. 8
INVENTOR.
RALPH J. KOERNER
BY Allen M. Sutton
ATTORNEY May 3, 1966 R. J. KOERNER 3,249,915
METHOD AND APPARATUS FOR VEHICLE DETECTION
Original Filed May 31, 1963 4 Sheets-Sheet 3

RALPH J. KOERNER
INVENTOR.

BY Allen M. Sutton

ATTORNEY

May 3, 1966 R. J. KOERNER 3,249,915
METHOD AND APPARATUS FOR VEHICLE DETECTION
Original Filed May 31, 1963 4 Sheets-Sheet 4
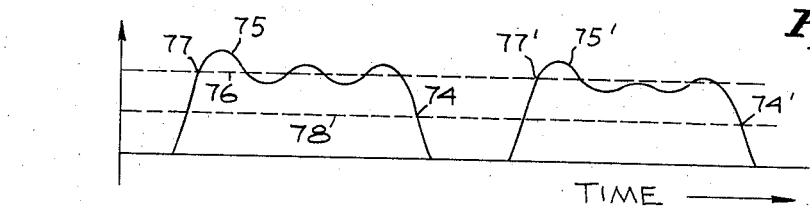
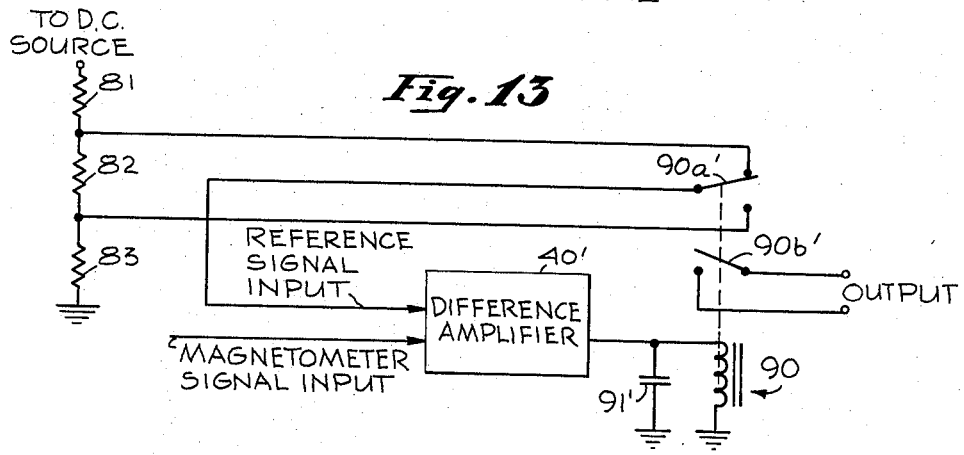
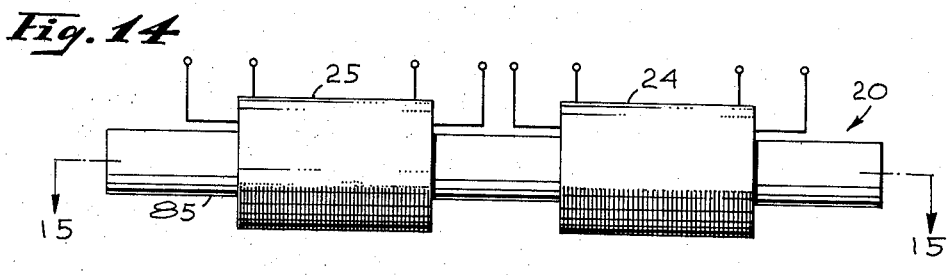
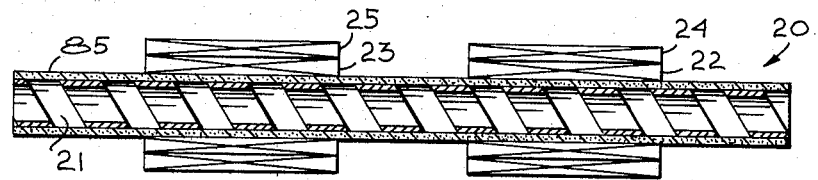
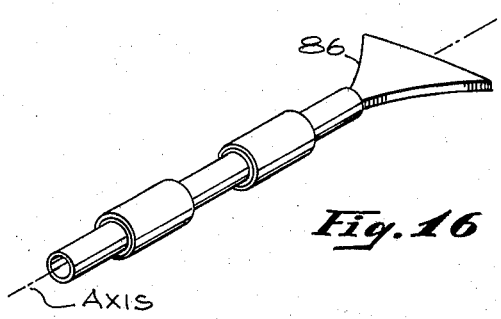
RALPH J. KOERNER
INVENTOR.
BY *Allen M. Sutton*
ATTORNEY

# United States Patent Office 3,249,915
Patented May 3, 1966

3,249,915
METHOD AND APPARATUS FOR VEHICLE DETECTION
Ralph J. Koerner, Canoga Park, Los Angeles, Calif., assignor to TRW Inc., a corporation of Ohio
Continuation of application Ser. No. 284,666, May 31, 1963. This application Apr. 20, 1965, Ser. No. 450,266
34 Claims. (Cl. 340—38)

This application is a continuation of copending application Serial No. 284,666, filed May 31, 1963, now abandoned, which was a continuation-in-part of copending application Serial No. 189,516, filed April 23, 1962, now abandoned, by Ralph J. Koerner and assigned to the same assignee as the present invention.

The present invention relates to improved methods and apparatus for detecting or sensing the presence of stationary or moving vehicles on or along a path or roadway circumscribing a portion of the earth's surface.

More particularly, the present invention is directed to improved arrangements for sensing the presence of vehicles either at rest or moving past a given location, where the vehicle structure may comprise non-uniformly distributed masses of different materials having a relative magnetic permeability greater than unity, so that the magnetic permeability of the vehicle is different from one portion to the next.

With an increasing number of automotive vehicles operating along heavily congested streets and highways, there is a growing need for a simple, reliable, low-cost method and apparatus for sensing the presence of the vehicles at prescribed locations along highways, freeways, turnpikes, etc. and at intersections between roads, as well as at locations within and along vehicular tunnels and bridges.

Many different traffic sensing methods and apparatus are currently in existence. For example, one commonly used sensor employs an electrical switch which is mechanically operated by a treadle installed at the surface of a roadway. Mechanically operated sensors are not only expensive to install, but are also subject to considerable wear and require frequent maintenance, and are highly vulnerable to adverse weather conditions with attendant ice, snow and mud. Certain types of sub-surface sensors, such as those employing wire coils, have also been used. The coils serve as either a means for producing a signal voltage in response to changes in the earth's magnetic field caused by a passing vehicle, or as an inductor the reactance of which changes when the structure of a vehicle passes near it. Generally, the coils of such sensors are rather large in size and are not only expensive to install, but are also undesirably affected by varying road conditions caused by weather, as well as by spurious signals inductively picked up from power lines and other electrical equipment which may be operated nearby. Moreover, in the prior use of sub-surface sensors, it has been the practice to install the sensors no further below the surface of a highway than is required to protect the sensors from the physical shock and vibration produced by heavy vehicles, such as trucks and buses.

As set forth in U.S. patent application Serial No. 117,307, entitled "Vehicle Sensing Systems," filed June 15, 1961, by John C. Beynon, and assigned to the assignee of the present application, a superior form of traffic sensing system may be based upon the measurement of the absolute intensity of the earth's magnetic field at prescribed locations along a designated pathway, such as a roadway or vehicular parking area. For this purpose, a flux-gate or other magnetometer may be employed. The vehicle sensing element of the magnetometer may be small in size and embedded directly beneath the surface of the roadway. Owing to the fact that in fabricating automotive vehicles, materials are used having a relative magnetic permeability greater than unity, the absolute intensity of the magnetic field acting upon the embedded sensing element will generally increase as the vehicle passes over its location. This increase will then be reflected in a change in the amplitude of an output signal delivered by the magnetometer, which in turn can be made to actuate suitable signal responsive means. However, during the time a moving vehicle is passing over the embedded sensing element of such a magnetometer, numerous perturbations are generally produced in the intensity of the earth's magnetic field. Multiple peaks corresponding to the perturbations appear in the magnetometer output signal and are troublesome if it is desired to determine accurately the number of vehicles which pass the sensing element over a given time period. This is because some of the magnetic field perturbations caused by a moving vehicle may reach levels having an absolute value less than ambient magnetic field intensity, that is, the magnetic field intensity as detected by the magnetometer sensing eelment in the absence of a vehicle. Not only does one type of vehicle produce fewer or more of such perturbations than another type of vehicle, but the maximum value to which the field intensity is increased as represented by any one of such perturbations also varies from one vehicle type to another. Hence, it becomes impossible to establish a critical amplitude threshold against which to compare the output signal of the magnetometer which, if exceeded thereby, constitutes an accurate indication of the passing of but one vehicle. Ideally, if all of the variations in the magnetometer output signal caused by a passing vehicle coresponded to magnetic field intensity levels having an absolute value above ambient, the establishment of such a threshold would be feasible.

However, as set forth in the above-identified patent application, one solution to the problem is to employ two magnetic sensors (magnetometers) suitably spaced apart along the roadway in the direction of vehicular travel. A latching circuit may then be coupled to the output circuits of the two magnetometers such that the latching circuit will be set or latched when the intensity of the field acting on the first magnetometer rises above a predetermined rather low threshold value, while it will be "reset" or "unlatched" when the intensity of the field acting on the second magnetometer likewise rises above a similar threshold value. One complete set-reset cycle of the latching circuit therefore represents the count of one passing vehicle. This arrangement, although useful, is undesirably expensive in that two sensors are required along with associated electronic circuitry.

Investigation has shown that the above-described variations in the output signal from the magnetometer in response to amplitude levels of magnetic field intensities below the ambient magnetic field value are due to the unique characteristics of magnetic fields, and the non-uniform distribution of the masses of materials having high magnetic permeability making up automotive vehicles.

More specifically, the present invention is based upon two observations. The first is the recognition of the fact that magnetic lines of force representing a magnetic field are both elastic in character and tend to repel one another. When an unmagnetized body having a magnetic permeability greater than unity is placed within a magnetic field, it will cause the lines of force representing the field to bend or converge toward the body. This results in an increase in the magnetic flux density in areas adjacent the body which may be observed upon planes normal to the direction which the lines of force would follow in the absence of the body.

Owing, however, to the repelling influence magnetic lines of force have upon one another, this above converging effect produced by the body causes only a localized distortion of the lines of force representing the ambient field. That is, just as the body effectively caused the magnetic lines of force to converge, the lines of force immediately after passing through the body repel each other and commence to diverge. Accordingly, at a relatively short distance from the body, the lines of force may assume a uniform distribution corresponding to the ambient conditions of the magnetic field in the absence of the body. Moreover, through areas or planes immediately adjacent the body, the flux density will be below that of ambient, since certain of the lines of force otherwise present in the areas adjacent to the body have been effectively diverted and caused to pass through the body.

Accordingly, it will also be seen that if two or more, but a limited number of such bodies, are closely spaced apart from one another along a direction normal to the ambient magnetic field, the flux density through those areas on the plane as may be defined by projecting the bodies thereon will be greater than ambient, while through areas on the plane between the projections it will be below ambient.

The above example is closely analogous to the body of an automotive vehicle in which masses, such as the engine, transmission, and differential, are generally spaced apart within the body. However, as an examination is made of the average field intensities near the bodies by sampling the average flux densities through sampling areas all of the same specified shape and size but at different locations upon a sampling plane, while at the same time successively spacing the plane at greater distances from the body, there will be found a critical distance from the body, for the specified size of sampling area, at and beyond which such flux density measurements, although decreased in value, will always be above ambient, both within the projection of the bodies upon the plane as well as between the projections themselves. The greater the size of the sampling area, the smaller this critical distance will be.

As a corollary of the foregoing, the second observation is that common forms of magnetic field sensing devices do not measure the magnetic field on a classical point-to-point basis as would be desired in their application to high detail mapping of magnetic field patterns. Indeed, most magnetic field sensing devices may be regarded as having an effective "flux collecting aperture" which may be of substantial area and assume various shapes. In the case of a flux-gate magnetometer, this aperture is of an area and shape defined by the size and shape of the magnetically permeable materials used in the fabrication of the magnetometer sensing unit, such as the magnetically saturable strip of the magnetometer, its associated flux collecting elements, if any, and the wire coils surrounding the strip. In a sense, therefore, such a magnetometer is responsive to the average magnetic field acting on an area corresponding in size and shape to the effective flux collection aperture of the magnetometer or, put differently, it gives an indication of the average flux density through this area.

In accordance, therefore, with one aspect of the present invention, advantage is taken of the fact that if a number of point by point measurements are made of the instantaneous value of flux density within a specified area on a sampling plane normal to the earth's ambient magnetic lines of force, and the plane is critically distanced from the surface of a roadway, then the average of all such measured values will be above ambient whenever a vehicle is positioned adjacent a predescribed location on the roadway.

In further accordance with the present invention, an accurate count may be made of vehicles passing the location by detecting the variations in the flux density values through a given area and by registering a single count for each continuous series of detected values, all of which are above ambient with at least one value in the series rising above a first specified magnitude, and where the series includes at least one subsequent value which is less than a second specified magnitude lower than said first specified magnitude.

In accordance with the foregoing, the present invention permits the realization of an improved vehicle detecting system wherein a magnetic field detecting means having a specified effective flux collection aperture is positioned adjacent the surface of a roadway, with the axis of the detecting means in substantial alignment with the earth's ambient magnetic field. The detecting means is positioned relative to the roadway so that its effective flux collection aperture is caused to coincide with a specified area on a plane transverse to the earth's ambient magnetic lines of force, through which specified area the instantaneous average magnetic flux density during the passing of a vehicle by said prescribed location does not fall below ambient. Means are then coupled to the detecting means and responsive to its output signal for registering a count in response thereto.

In a preferred form of the present invention, the above counting means includes a novel signal responsive threshold control system which conditions the registration of each count upon the intensity of the detected magnetic field exceeding a first threshold level, following which it must fall below a second lower threshold. In accordance with the present invention, the first and second threshold levels are respectively established at amplitude levels above and below that level corresponding to the lowest absolute value of above ambient flux density which is produced during the passing by the prescribed location of any one of the various types of vehicles it is desired to count.

One embodiment of a preferred form of the invention also includes a stabilizing circuit which minimizes variations in the operation of the apparatus due to temperature changes or variations in amplitude of signals provided to the magnetometer from energizing means.

A better understanding of the invention may be had from a reading of the following detailed description and an inspection of the drawings, in which:

FIGURE 1 is a diagrammatic illustration of the earth's ambient magnetic field as it enters the surface of the earth viewed from a location in the northern hemisphere looking in a generally northerly direction towards the earth's north magnetic pole;

FIG. 2 is a diagrammatic illustration of the earth's magnetic field taken along a plane defined by the line 2—2 of FIG. 1;

FIG. 3 is a diagrammatic illustration of the earth's magnetic field taken in a location and viewed in a direction corresponding to FIG. 1 and illustrating the concentration of the earth's magnetic field produced by the presence of a magnetically permeable body;

Figure 9:
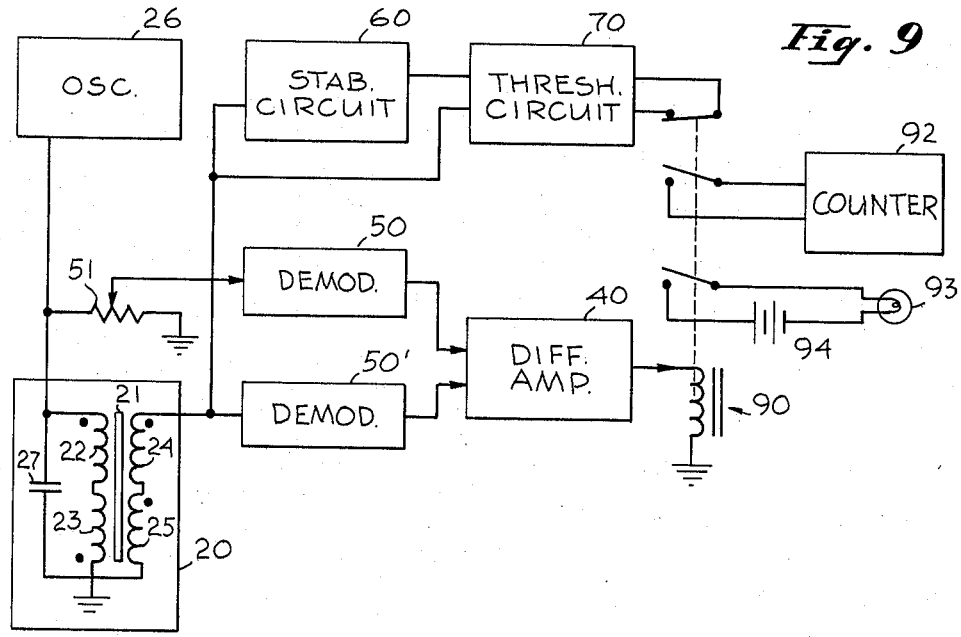
Figure 10:
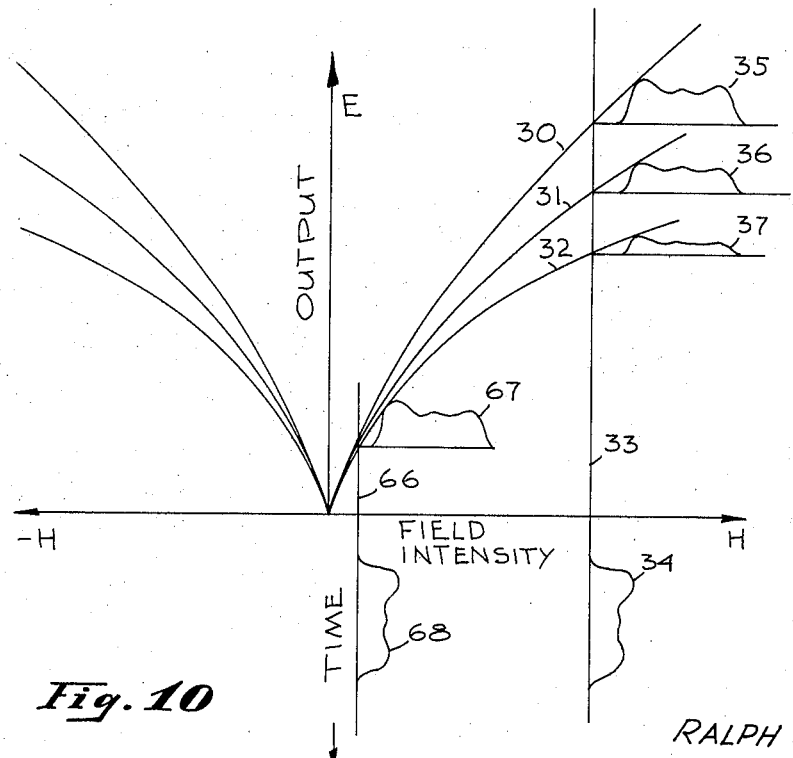
Figure 11:
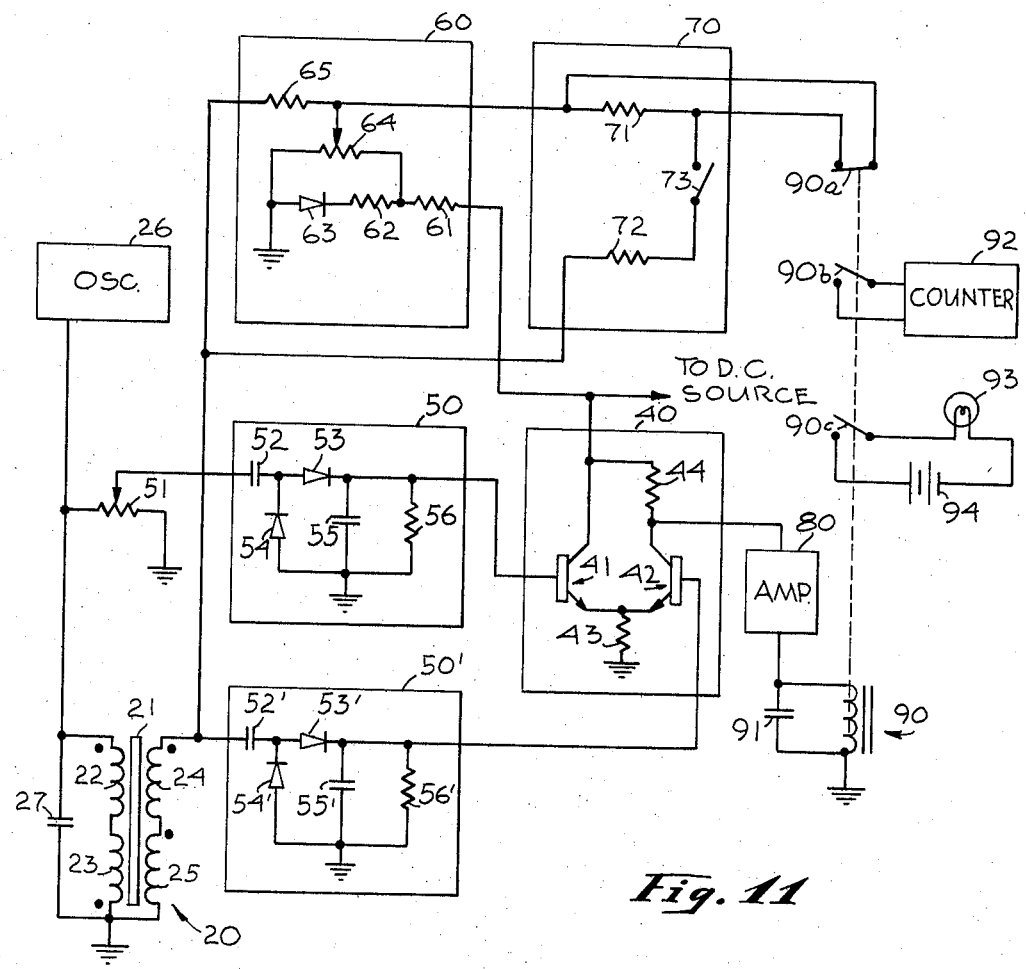
Figure 17:
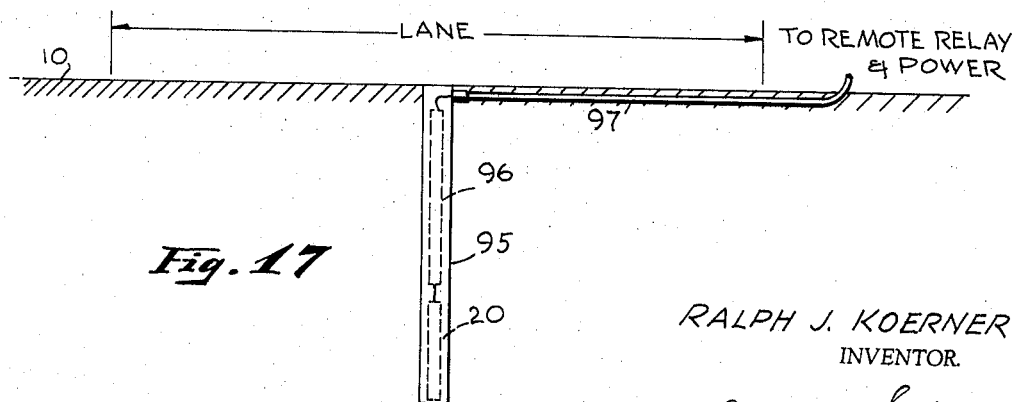

FIG. 4 comprises a series of diagrammatic illustrations of the earth's magnetic field as it appears on the planes defined by the lines A—A, B—B, and C—C in FIG. 3;

FIG. 5 is a diagrammatic illustration of an automotive vehicle passing along a path above apparatus for sensing the value of the earth's magnetic field in accordance with the invention;

FIG. 6 comprises a series of graphical illustrations of electrical signals which may be derived from a magnetic field sensing device located in different positions as shown in FIG. 5;

FIG. 7 is a graphical illustration of the earth's magnetic field taken from a location in the northern hemisphere and viewed in a generally westerly direction with reference to the earth's north magnetic pole and showing the manner in which a magnetic field sensing device may be positioned in accordance with the present invention where the magnetic field sensing device is to be positioned below the surface of a vehicle path;

FIG. 8 is a diagrammatic illustration of the earth's magnetic field taken from a location in the northern hemisphere and viewed in a generally westerly direction with reference to the earth's north magnetic pole illustrating the manner in which a magnetic field sensing device may be positioned in accordance with the invention where the magnetic field sensing device is to be located above a vehicle path;

FIG. 9 is a combined block and schematic circuit diagram of apparatus for sensing automotive vehicles in accordance with the invention and including apparatus for establishing predetermined thresholds of operation;

FIG. 10 is a graphical illustration of the response curve of a magnetic field sensing device in which the value of the output signal is plotted as a function of applied magnetic field value;

FIG. 11 is a schematic diagram similar to FIG. 9 but with greater schematic detail;

FIG. 12 is a set of graphical illustrations of various electrical signals appearing in the arrangement of FIG. 9 plotted as a function of time;

FIG. 13 is a combined block and schematic circuit diagram of a simplified arrangement for use in conjunction with a magnetic field sensing device for establishing predetermined thresholds of operation;

FIG. 14 is a side view of a flux gate magnetometer sensing element which may be employed as a magnetic field sensing device in accordance with the invention;

FIG. 15 is a sectional view taken along line 14—14 of FIG. 13;

FIG. 16 is a side view of an alternative arrangement of a flux gate magnetometer sensing element including magnetically permeable elements for defining a predetermined flux collecting aperture; and FIG. 17 is a diagrammatic illustration showing another way of positioning the apparatus of the present invention in the path of a passing vehicle.

In order to facilitate an understanding of the manner in which the method of the present invention may be practiced and before considering particular systems in accordance with the invention for practicing the method, attention will be given to certain phenomena associated with the earth's magnetic field and the effects on the field of a magnetically permeable body such as an automotive vehicle.

In FIG. 1 there is illustrated diagrammatically the configuration of the ambient earth's magnetic field in the northern hemisphere viewed in a direction looking towards the earth's northern magnetic pole. As may be seen in FIG. 1, the earth's magnetic field is represented by magnetic lines of force which are generally parallel and which enter the surface of the earth 10. It will be noted in FIG. 1 that the earth's magnetic field is uniform where it is assumed that no adjacent magnetically permeable object or material effects a distortion or concentration thereof. Uniform distribution of the earth's magnetic field may also be seen from FIG. 2 of the drawings which constitutes a diagrammatic illustration of the configuration of the field as seen along a plane below the earth's surface defined by the line 2—2 in FIG. 1. In conventional fashion, the lines of force in the diagram of FIG. 2 are shown as dots indicating that the direction of the field as shown is out of the plane of the drawing of FIG. 2 in a direction towards the observer. It further should be noted that the graphical illustration of FIG. 2 corresponds to the configuration of the earth's magnetic field at locations both closer to the earth's surface 10 than the line 2—2 and farther from the earth's surface 10.

The uniform nature of the earth's magnetic field as shown in FIGS. 1 and 2 obtains in the absence of any adjacent magnetically permeable object. However, upon the introduction of a magnetically permeable object into the earth's magnetic field in the region under consideration, a concentration of the field within the magnetically permeable object takes place so that the magnetic field lines are no longer uniformly distributed but converge upon the magnetically permeable object. By virtue of the fact that automotive vehicles contain relatively large quantities of magnetically permeable material, it has been proposed that the presence or passage of an automotive vehicle may be detected or sensed by measuring the value of the earth's magnetic field near the location of the vehicle. Due to the concentration of the earth's magnetic field in the magnetically permeable portions of an automotive vehicle, the presence or passage of such a vehicle produces perturbations in the earth's magnetic field which may be sensed as an indication of the presence of the vehicle.

However, the magnetically permeable material in substantially all vehicles is distributed in such a way as to produce a number of different regions of concentration of the earth's magnetic field with intermediate regions in which the field may drop below the ambient value obtaining in the absence of the presence of such a vehicle. This phenomenon is illustrated in FIGS. 3 and 4 of the drawings in which FIG. 3 shows a hypothetical automotive vehicle 11 which has been greatly simplified and for purposes of illustration may be considered to comprise two magnetically permeable cylinders 12 and 13 corresponding to the wheels and axles of a conventional vehicle upon which is borne a magnetically permeable plate 14 corresponding to the body and chassis of the vehicle. In any event, as may be seen in FIG. 3, the earth's magnetic field lines are concentrated in the region of the magnetically permeable portions of the hypothetical vehicle 11. Moreover, it may be noted that the portions which have the greatest mass of magnetically permeable material are correspondingly effective in producing a greater convergence of the magnetic field lines.

In order to facilitate an understanding of the effects of the presence of a magnetically permeable vehicle in the earth's magnetic field, FIGS. 4A, 4B and 4C diagrammatically illustrate the configuration of the field on planes beneath the surface of the earth 10 as shown by the corresponding lines A—A, B—B, and C—C of FIG. 3. In a region near to the earth's surface 10, as shown in FIG. 4A, the earth's magnetic field is concentrated in areas constituting a projection of the positions of the vehicle 11 on the plane. Moreover, between the areas of concentration of the magnetic field, it will be noted that fewer magnetic flux lines appear than in the representation of the earth's ambient magnetic field of FIG. 2. This indicates that the concentration of the earth's magnetic field by the magnetically permeable portions of the hypothetical vehicle 11 produces a magnetic field value less than the ambient field value in regions intermediate of the regions in which the earth's magnetic field is concentrated. Accordingly, by measuring the average value of the earth's magnetic field within a given area 15' on a given plane in the absence of a vehicle and by comparing these values with the values obtained in the presence of a vehicle, it has been found that in regions near to the earth's surface average values of magnetic flux density over a given area often less than those obtained in the absence of a vehicle.

In prior art systems in which magnetic field sensing devices are employed for detecting the presence of an automotive vehicle, the perturbations produced by the alternate concentrations and intermediate less than ambient field values have resulted in electrical signals being generated having several peaks between which the electrical signal falls below the ambient value which is obtained from the magnetic field sensing device in the absence of an automotive vehicle. Due to the fact that the configuration of magnetically permeable materials in automotive vehicles differs from model to model, and hence the number of peaks in the electrical signal varies, it has been impossible to establish any single mechanism for reliably determining whether an electrical signal or a measured set of magnetic field values taken at or immediately adjacent the earth's surface represents one or more automotive vehicles. Since all known vehicle detecting systems which sense magnetic field values have taken their measurements in the region near to the earth's surface 10, such systems have suffered from disadvantages.

In accordance with the present invention, however, it has been discovered that the characteristics of the earth's magnetic field enable measurements to be taken in regions where a reliable determination may be made of the presence of each individual vehicle. FIG. 4B illustrates the distribution of the earth's magnetic field on a plane taken along line B—B of FIG. 3. As shown in FIG. 4B, the presence of the vehicle 11 produces a concentration of the lines of force representing the earth's magnetic field in a pattern which is somewhat similar to that illustrated in FIG. 4A. However, in FIG. 4B, the degree of concentration of the earth's magnetic field is somewhat less than that shown in FIG. 4A. Furthermore, in between the areas in which the field is concentrated, the distribution of the earth's magnetic field lines indicates that over a given area of predetermined size and shape, such as the dashed circle 15, the average flux density is never less than that in the ambient field shown in FIG. 2. In accordance with the present invention, the earth's magnetic field is observed in an area as a plane such as that shown in FIG. 4B at a predetermined distance away from an automotive vehicle where the distribution of the earth's magnetic field within the given area will produce an average value of flux density above the earth's ambient field value. Therefore, the aforesaid problems associated with perturbations of the earth's magnetic field produced by an automotive vehicle which fall below the ambient value are overcome.

By way of comparison, FIG. 4C shows the distribution of the earth's magnetic field in a plane defined by the line C—C of FIG. 3. Here again, some concentration of the earth's magnetic field is visible. However, the degree of concentration is much less than that illustrated in FIG. 4B and even though an average value taken across the defined area 5″ is above the ambient value, the degree of concentration is relatively low. This indicates that in determining the presence of an automotive vehicle in accordance with the present invention, the area of observation, which is a specified shape and size, is preferably spaced from the roadway or vehicle by a distance not substantially greater than that which ensures an above ambient flux density of a specified magnitude in and over the observation area during the passing by or presence over said area of those vehicles of interest having the lowest over-all effective magnetic permeability.

In the context of the present invention, a better understanding of the phenomena underlying its operation may be had by considering in more detail the nature of the magnetic field distortion produced by automotive vehicles as shown in FIGS. 3 and 4. In this connection, and as hereinabove and as will be hereinafter intended, the concept of a vehicle being present over or passing by a given area of observation refers to the above-ambient flux density condition produced in and over the observation area by reason of the vehicle's influence on the earth's magnetic field passing through the observation area. Consider, for example, the previously-referred to FIG. 4B. Here it will be seen that a body, such as an automotive vehicle (if it is not magnetized), will usually cause the average flux density to decrease through areas immediately adjacent to the periphery of the body of the vehicle. Thus, a vehicle, as it passes over or near an observation area, will cause a rarefication or diminution of the average flux density through the observation area immediately preceding and immediately following its passing. It will be clear, therefore that one of the improvements offered by the present invention is realized during the time periods between the instant the influence of a vehicle first causes an above-ambient increase in the flux density through the area of observation, and the next successive instant in time such vehicle causes a reduction in this flux density to an ambient value. Thus, a series of magnetic field values can be measured in the presence of a vehicle, which values will continuously be above the earth's ambient magnetic field value.

Even though for each passing vehicle the series of measured values may fluctuate to some degree due to the concentrations of the magnetic fields produced by different portions of the vehicle, yet, since none of the measured values returns to an ambient magnetic field value, it may be concluded that the registration of a single vehicle may be made for every consecutive series of values which first rise above an ambient magnetic field value and stay above the ambient magnetic field value, dropping back to the ambient magnetic field value only at the conclusion of the passage of the vehicle. Therefore, in the practice of the method of the present invention, a given area of observation of given size and shape may be selected, the plane in which said area of observation lies may be positioned from the automotive vehicle transverse to the lines of the earth's magnetic field, and a series of measurements of average flux density of the earth's magnetic field in the given area may be made with a determination being made from the measured series of values as to the passage of each automotive vehicle through registering a count for every consecutive series of measured values substantially all of which are above the ambient value of the earth's magentic field. Although the method in accordance with the invention may be practiced manually by a point-to-point measurement of the values of the magnetic field falling within a predetermined given area on a plane distanced from the path of the automotive vehicle as suggested above, a preferred arrangement of practicing the invention contemplates the positioning of a particular magnetic field sensing device at a location at which the device senses the average value of the magnetic field falling within a given area of specified shape and size at the defined location on a plane transverse of the earth's magnetic field lines. The manner of positioning such a device responsive to flux in a specified observation area and the electrical signals which may be obtained thereby are illustrated in FIGS. 5 and 6 of the drawings and will be discussed hereinafter.

First, however, consideration will be given to what will also hereinafter be termed the "effective flux collecting aperture" of a given magnetic field sensing device and how its size and shape must be taken into consideration in practicing the present invention.

As will be seen, once the proper location of a given observation area of given size and shape has been determined, a field sensing device such as a magnetometer is required having an "effective flux collection aperture" which is of a shape and size which matches or completely envelops the given observation area.

As noted previously, point-by-point magnetic field measurement techniques do not obtain in the use of a magnetic sensing element having itself a magnetically permeable saturable strip. From a practical standpoint, the size and shape of the area in which magnetic fields will be sensed by a particular magnetometer may be discovered by placing the magnetometer in a uniform magnetic field and observing the amplitude changes in its output signal as a very small sphere of highly magnetic permeable material is moved about a plane (as on a glass plate) displaced from the magnetometer and normal to the effective axis of the magnetometer. For the purposes of the present invention, it is useful to further consider the fact that the area in which the magnetic field is sensed by the magnetometer may be referred to as the effective aperture and in the case of the flux gate magnetometer which is made up of a substantial mass of highly magnetically permeable material will appear smaller as plotted on planes near the magnetometer than on planes more distant therefrom. Owing to the above-mentioned converging effect of a magnetic field in the presence of magnetically permeable materials, and the repelling effect the field lines have on one another, there will exist for each magnetometer a critical distance from the sensing unit beyond which the size of the effective aperture will not increase. This is generally quite close to and at a specified distance from the sensing unit and will be hereinafter referred to as the "effective flux collecting aperture."

FIG. 5 is a diagrammatic illustration looking towards the earth's north magnetic pole from a location in the Northern Hemisphere with an automotive vehicle 16 passing along a pathway on the earth's surface 10 in a generally easterly direction.

The particular automotive vehicle 16 shown in FIG. 5 comprises a structure in which magnetically permeable materials are concentrated in the regions of the front axle, the rear axle and the transmission, a corresponding convergence of the lines of force representing the earth's magnetic field is shown. The proper location for a magnetic field sensing device such as a magnetometer 20 is shown on a level below the earth's surface 10 at which the magnetic field sensing device is adapted to provide an output signal corresponding to the average flux density through an area at a predetermined distance below the surface 10 transverse to the earth's magnetic field as described above in connection with FIGS. 3 and 4. As noted, the magnetometer 20 is adapted to provide a signal corresponding to the flux passing through a given area 15 on a plane as shown in FIG. 4B. For comparison purposes, two other positions for the magnetometer 20 are illustrated in phantom in FIG. 5. In a near position to the earth's surface 10 the magnetometer is designated as 20' while in a far position the magnetometer is designated as 20".

The waveforms of FIG. 6 represent electrical signals which may be derived from a magnetic field sensing device in the arrangement of FIG. 5. FIG. 6A corresponds to the electrical signal provided when the magnetometer 20' is in the near-to-the-surface position. FIG. 6B represents the electrical signal provided by the magnetometer 20 in the predetermined position in accordance with the present invention, and FIG. 6C corresponds to the electrical signal derived from the magnetometer 20" in the far position as shown in FIG. 5.

As an automotive vehicle 16 passes along the path on the earth's surface 10, the magnetometer 20 functions to provide an output signal corresponding to the average flux density within a given area on a predetermined plane. Concentration of the earth's magnetic field in the regions of high magentic permeability of the vehicle 16 is readily apparent from an inspection of the electrical signals of FIG. 6. However, the waveform of the magnetometer 20' at or near the surface of the earth 10 (FIG. 6A) illustrates that the electrical signal follows amplitude variations which rise above and fall below the ambient value obtained in the absence of a vehicle. This leads to an electrical signal having multiple peaks with the attendant necessity for providing some means for determining whether or not a series of amplitude variations in the electrical signal represents one or more vehicles as described above. However, with the magnetometer 20 being placed in a position in accordance with the present invention, as shown in FIG. 6B, the electrical signal follows a series of consecutive values rising above the ambient value and falling back to the ambient value only upon the passage of the vehicle from the location of the magnetic field sensor. The result is that the electrical signal of FIG. 6B uniquely identifies the passage of a single vehicle. The waveform of FIG. 6C corresponds to the placement of the magnetometer shown at 20" farther away from the vehicle path leading to the electrical signal of FIG. 6B. As shown in FIG. 6C, the signal rises from ambient value and returns to ambient value but it is of relatively low amplitude and is therefore subject to disturbances caused by extraneous effects such as noise or the passage of a magnetically permeable body in an adjacent region such as an automobile passing in an adjacent traffic lane. Therefore, the optimum position for the placing of a magnetic field device such as the magnetometer 20 is that at which a substantial amplitude variation of the electrical signal appears but at which the electrical signal does not fall below the ambient value during the passage of the vehicle. This optimum location may be determined for a particular magnetic field sensing device by gradually lowering the magnetometer below the surface of a roadway until the effective flux collecting aperture of the magnetometer encompasses a given area on a selected plane transverse to the earth's ambient magnetic field as described above.

Although the diagrams of FIGS. 1, 3 and 5 illustrate the magnetic field lines as being vertical with respect to the earth's surface, it is well known that in most locations on the earth the magnetic field lines are inclined with respect to the surface. The inclination of the field lines in FIGS. 1, 3 and 5 may be seen when viewed from a transverse position. FIGS. 7 and 8 show the inclination as well as the proper position for a magnetic field sensing element with respect thereto in accordance with the present invention. Being angled with respect to the earth's surface, it is sometimes considered that the earth's magnetic field has both a vertical and horizontal component with the vector sum of the vertical and horizontal components representing the field and making an angle with the earth's surface which is sometimes referred to as the angle of inclination or angle of dip. FIGS. 7 and 8 may be considered to be taken from a position in the northern hemisphere looking an easterly direction.

As shown in FIG. 7, the magnetic field sensing element 20 is positioned beneath the earth's surface at an angle with reference to the earth's surface 10 but in a position in which the element is aligned with the earth's magnetic field lines in an ambient condition, i.e. in the absence of of a permeable body such as a passing vehicle. By this means, a maximum output signal may be provided from the magnetic field sensing element since the effective flux collecting aperture will encompass an area on a plane transverse of the earth's ambient magnetic field lines. In a similar fashion, FIG. 8 shows the magnetometer 20 suspended above the earth's surface and is aligned with the earth's ambient magnetic field lines. The correct location of the sensing element may be theoretically determined in the absence of any interfering mass of magnetically permeable material in the earth by the equation $$L = \frac{d+h}{\tan \cdot \alpha}$$

where $h=$ the height of the effective magnetic height of a vehicle above the road surface,
$d=$ the depth of the magnetometer below the road surface,
$L=$ the optimum lateral displacement of the magnetometer from directly beneath the vehicle's effective magnetic center, and
$\alpha=$ local dip angle of the earth's magnetic field.

For example, the dip angle of the earth's magnetic field at Los Angeles, California, is 60°. Furthermore, it has been discovered that the effective magnetic height of the average vehicle is approximately 12 inches. By way of example, where the magnetometer is constructed in the manner which is described below in connection with FIGS. 13–15, a flux collecting aperture may be determined which is such that an appropriate distance below the surface is 20 inches.

In FIG. 9 there is shown one suitable arrangement for use in conjunction with a flux gate magnetometer for performing a magnetic field sensing operation in accordance with the invention. The magnetometer element 20 may be positioned as shown in FIGS. 5, 7 and 8 with its flux collecting aperture being arranged to sense the average magnetic field density in a given area on a plane transverse to the earth's magnetic field as described above.

The magnetometer 20 comprises a magnetically saturable element 21 forming a core upon which a plurality of windings 22, 23, 24 and 25 are placed. The windings 22 and 23 comprise the energizing windings and are connected serially with their respective winding directions for the production of magnetic flux being conventionally illustrated by means of dots. Thus, it will be seen that the winding 22 produces a magnetic field in response to current flow in a given direction which is opposite with respect to the magnetic field produced by the winding 23 in response to current flow in the same direction. Accordingly, one section of the saturable strip 21 is magnetized in a first direction in response to current flow through the windings 22 and 23, while a second lower section of the saturable strip 21 is magnetized in the opposite direction.

The serially connected windings 22 and 23 of the magnetometer receive an alternating energizing current from a suitable source such as an oscillator 26. A capacitor 27 is selected to provide a parallel resonant circuit in combination with the inductance of the windings 22 and 23 at the frequency of the oscillator 26. Thus, the circuit is tuned so as to operate at maximum efficiency, requiring a minimum amount of power from the oscillator 26. The output windings 24 and 25 are also connected serially except that their orientation is alike as indicated by the reference dots.

The alternating current wave applied to the energizing windings 22 and 23 is such that the field applied to the saturable core 21 is driven to magnetic saturation for a major portion of each half-cycle. Since the output windings 24 and 25 are connected oppositely as compared to the energizing windings 22 and 23, in the absence of an externally applied field to the saturable core 21, any voltages which may be induced in the output windings 24 and 25 are effectively cancelled. That is, in the absence of an external magnetic field, the saturable strip 21 is brought to the same degree of saturation in its upper section as in its lower section on each half-cycle of the alternating current energizing wave.

Further, due to the fact that the windings 22 and 23 are oppositely wound, voltages are induced in the output windings 24 and 25 which are oppositely phased so as to effectively be cancelled in the output circuit. However, assuming that an external magnetic field of a given direction passes through the saturable strip 21, either the upper or the lower section of the magnetometer is brought to a saturation level by each half-cycle of the alternating current passing through the windings 22 and 23 before the other section is brought to saturation level. The result is that transformer action ceases (clipping occurs) in one part of the magnetometer on each half-cycle of the applied alternating current wave prior to the cessation of transformer action in the other section. Therefore, for each half-cycle of applied alternating current from the oscillator 26, a pulse appears in the output circuit, with the frequency of the output pulses being twice that of the frequency of the oscillator 26, inasmuch as one such pulse appears for each half-cycle of the wave from the oscillator 26. Accordingly, whenever a magnetic field is impressed upon the saturable strip 21, there is produced an alternating current wave of double the energization frequency and having an amplitude corresponding to the magnitude of the externally applied magnetic field. Thus, the magnetometer shown in FIG. 9 is adapted to function as a magnetic field sensing device.

In practical systems utilizing magnetic field sensing elements such as flux gate magnetometers, it has been found that signal output from the magnetometer will be proportional to the detected magnetic field. However, some variations in the output signal will occur even with a constant value of applied magnetic field. These variations are caused by changes in the operating levels of the various subsystems associated with the magnetometer. It has been found that drifting of the frequency of oscillator 26 and amplitude changes in the oscillator output cause at least a portion of the undesirable variations in the value of the magnetometer output signal. In addition, it has been noted that temperature changes and small variations in the detected magnetic field due to reasons other than the passage of a vehicle to be detected may affect the magnetometer output signal and result in erroneous readings. Accordingly, in a preferred embodiment of the present invention, a circuit shown in FIG. 9 and in greater schematic detail in FIG. 11 is employed, which substantially eliminates the aforementioned sources of error.

As shown in FIG. 9, the oscillator 26 energizes the input windings 22 and 23 of the magnetometer 20, by supplying a signal of relatively constant amplitude and frequency. A predetermined portion of the output signal of the oscillator 26 is also supplied to a difference amplifier 40 to establish a reference operating point therefor. The signals are supplied through a demodulator 50, which receives them from the pick-off arm of a potentiometer 51 connected between the oscillator 26 and ground. The output windings 24 and 25 of the magnetometer 20 are coupled to the difference amplifier 40 through a demodulator 50'. By so interconnecting the oscillator 26, the magnetometer 20 and the difference amplifier 40, any variations in the output signal of the oscillator 26 will have a minimum effect on the output of the difference amplifier. Although a change in the output signal of the oscillator 26 will affect the output of the magnetometer 20, it will also change the reference operating point of the difference amplifier 50, which determines the minimum amplitude of the output signal of the magnetometer 20 required to cause difference amplifier 50 to provide a usable output signal. Thus, the over-all accuracy of operation of the apparatus is greatly enhanced.

The apparatus of the present invention also incorporates a stabilization circuit 60 which supplies a constant direct current (D.C.) bias to the output windings 24 and 25 of the magnetometer 20, thereby establishing an ambient operating point of the magnetometer which further minimizes the undesired effects of changes in the output signal of the oscillator 26 on the operation of the apparatus. A threshold circuit 70 is coupled to the stabilization circuit 60 and operates to establish a first threshold level which determines the minimum magnetic field intensity which the magnetometer 20 has to detect in order to cause a usable output signal from the difference amplifier 50. The threshold circuit 70 may further operate to establish a second threshold level, lower than the first, below which the detected magnetic field intensity must fall before the output signal from the difference amplifier ceases.

The operation of the stabilization circuit 60 in establishing an ambient operating point for the magnetometer may better be understood by reference to the graphical illustration of FIG. 10. In FIG. 10, the response characteristics 30, 31 and 32 illustrate values of the output signals of the magnetometer 20 as a function of detected magnetic fields for three different values of energizing oscillator signal amplitudes. When a magnetometer, such as that shown in FIG. 9, is in proper position to detect the passage of a vehicle, the earth's ambient magnetic field will establish a steady state operating condition as illustrated by line 33. Upon the passage of a vehicle producing a perturbation of the earth's magnetic field, a variation in field intensity as indicated at 34 is impressed upon the magnetometer along with the steady state ambient magnetic field. The values of the output signals from the magnetometer may vary as shown by waveforms 35, 36 and 37, depending upon the operating conditions of the magnetometer. Thus, if the magnetometer's response characteristic follows the curve 30, the waveform 35 is produced, which has relatively great amplitude variations since the slope of the curve 30 at its intersection with the steady state operating line 33 is very steep. The next lower response characteristic 31, representing a somewhat different set of operating conditions of the magnetometer, produces the output waveform 36 having a base line lower than that of the waveform 35 and, in addition, smaller amplitude variations due to the fact that, at the intersection point between the line 33 and the curve 31, the curve 31 is not as steep as the curve 30. Still another set of operating conditions of the magnetometer is indicated by the response characteristic 32 which produces the waveform 37 having a lower base value and lesser amplitude variations than either of the waveforms 35 or 36 due to the slope of the curve 32. Therefore, from an inspection of FIG. 10, it is apparent that the change in the operating conditions of the magnetometer, due to changes of the amplitude values of the signal from the energizing oscillator 26, may result in different output signals from the magnetometer, even though the affecting variation of the magnetic field intensity remains the same.

In the apparatus as shown in FIG. 11, the stabilization circuit 60 which supplies D.C. biasing current to the output windings 24 and 25 of the magnetometer 20 is comprised of resistors 61 and 62 connected in series with a Zener diode 63 between a substantially constant source of D.C. voltage and ground. A potentiometer 64 is connected across the Zener diode 63 and the resistor 62, and the movable arm of the potentiometer is connected to the output windings of the magnetometer through a fixed resistor 65. The Zener diode 63 serves as a regulator to provide a reasonably constant potential across the potentiometer 64.

By adjusting the position of the movable arm of potentiometer 64, the amount of current flowing from the D.C. source through fixed resistor 61, potentiometer 64, fixed resistor 65 and the output windings 24 and 25 of the magnetometer may be so adjusted as to impress a magnetic field upon the saturable element 21 of the magnetometer, the field having a direction which is subtractive with respect to the earth's ambient magnetic field applied thereto. The effect of establishing such a subtractive magnetic field upon the saturable element 21 of the magnetometer is shown in FIG. 10 in which an operating condition is established as indicated by a line 66, which represents a new value in steady state ambient condition of the magnetic field applied to the saturable element 21 of the magnetometer 20. The line 33 represents the earth's ambient magnetic field value which is reduced to the level indicated by line 66 by the effect of the D.C. biasing current supplied by the stabilization circuit 60 to the output windings of the magnetometer, thereby establishing a new ambient operating point. In FIG. 10, it will be observed that the response characteristics 30, 31 and 32 are extremely close together at the operating point defined by the new steady state operating line 66. The result is that any variations in the output signal of the oscillator 26 have a relatively small effect upon the output signal of the magnetometer 20 as represented by waveform 67, in response to a change in the detected magnetic field as represented by waveform 68. Moreover, the slopes of the curves 30, 31 and 32 are steep at their point of intersection with the line 66 so that a somewhat larger output signal is obtained from the magnetometer for the same variation in the detected magnetic field than that obtainable at the operating point defined by the line 33.

As noted above, the actual signal appearing across the output windings of the magnetometer is an alternating signal of twice the frequency of the energizing signal from the oscillator. For purposes of illustration, the waveforms shown in FIG. 10 represent the envelopes of the signals appearing across the output windings of the magnetometer and correspond directly to the signals supplied by the magnetometer for demodulation and rectification.

As shown, the output signal from the magnetometer 20 and a portion of the signal from the oscillator 26 are respectively provided to the difference amplifier 40 through demodulators 50 and 50'. Since the two demodulators are made to be as similar as possible, only the demodulator 50 will be described in detail. The demodulator 50 includes a capacitor 52 serially connected with a diode 53 to whose anode the oscillator signal from the arm of potentiometer 51 is provided. The cathode of another diode 54, whose anode is grounded, is also connected to the anode of diode 53. The cathode of the diode 53 is connected to one end of a parallel combination comprising a capacitor 55 and a resistor 56, the other end of which is grounded. The two diodes 53 and 54 operate in conjunction with the capacitor 52 to provide voltage doubling and rectification, and the capacitor 55 and resistor 56 act as an integrating or smoothing network across which a positive output signal appears.

The output of the demodulator 50 is essentially a steady state direct voltage whose level depends upon the setting of the movable arm of potentiometer 51. The output of the demodulator 50' is a demodulated signal which may take the form of the wave shape 67 shown in FIG. 10. Demodulators 50 and 50' have identical components in circuitry, as nearly as possible, thereby minimizing variations in performance of the apparatus due to changes of temperature, since any temperature variations will affect both demodulators equally and the relative values of the demodulated signals will remain substantially constant.

As previously noted, the output signals of the demodulators 50 and 50' are provided to the difference amplifier 40. As seen in FIG. 11, the difference amplifier 40 comprises a pair of NPN transistors 41 and 42 having their emitters connected together and to ground through a fixed resistor 43. The collector of the transistor 41 is connected directly to the D.C. source while the collector of the transistor 42 is connected to that source through a resistor 44. The base of the transistor 41 is connected to receive output signals from the demodulator 50 and the base of the transistor 42 is connected to receive output signals from the demodulator 50'. Output of the difference amplifier 40 is taken from the collector of the transistor 42.

In operation, the steady state D.C. signal supplied from the demodulator 50 (reference signal) to the base of the transistor 41 controls the degree of conduction of that transistor and, hence, the voltage drop across the resistor 43. If the input signal to the base of transistor 42 from the demodulator 50' (magnetometer signal) is of insufficient amplitude to drive its base positive with respect to its emitter, the transistor 42 will be nonconductive and there will be no output signal from the difference amplifier. On the other hand, if the signal from the demodulator 50' is of sufficient amplitude to drive the base of transistor 42 positive with respect to its emitter, the transistor will conduct and the voltage on its collector will decrease, thus providing a negative-going output signal. The amplitude of the signal from the demodulator 50' required to make the transistor 42 conductive is, of course, determined by the voltage on the base of the transistor 41, which in turn is controlled by the setting of potentiometer 51 in the input to the demodulator 50.

The output of the difference amplifier 40 is supplied to a conventional D.C. output amplifier 80, which inverts and amplifies the signal from the difference amplifier. The output of the amplifier 80 is utilized to energize the coil of a relay 90, which has a normally-closed contact 90a and two normally-open contacts 90b and 90c. The coil of relay 90 is shunted to ground by a capacitor 91 whose purpose will later be described.

Although the techinques described heretofore for the placement of a magnetometer sensing element and the stablization thereof are adapted to provide an output signal from the magnetometer which may readily be distinguished as representing each vehicle sensed, the operation of the apparatus may be enhanced through the establishment of certain threshold levels of operation to achieve an even greater degree of accuracy in registering the passage of each vehicle sensed. This is accomplished by the threshold circuit 70 acting in conjunction with the stabilizing circuit 60. As previously explained, the stablizing circuit 60 provides a bias current to the output windings of the magnetometer 20 to oppose the effect of the earth's ambient magnetic field. If, now, that bias current is increased, a first threshold level is established which determines the minimum magnetic field intensity that the magnetometer must detect in order to provide a signal from the output amplifier 80 of sufficient amplitude to energize the coil of relay 90. The bias current is increased by means of the threshold circuit 70.

The threshold circuit 70 comprises resistors 71 and 72 and a manually operated switch 73, all connected in series and across the resistor 65 in the stablizing circuit 60. The resistor 71 is normally short circuited through the normally closed contacts 90a of the relay 90. The reason for so connecting the resistor 71 is to permit establishing a second threshold level, lower than the first, below which the detected magnetic field intensity must fall before the relay 90 is de-energized once it has been energized.

In operation, the apparatus is initially adjusted with the switch 73 in the threshold circuit 70 in an open position (as shown). The movable arm of potentiometer 64 in the stablizing circuit 60 is adjusted to supply the magnetometer 20 with D.C. biasing current sufficient to limit the amplitude of its output signal to be substantially equal to the reference signal which is applied to the demodulator 50 from the oscillator 26. Under these conditions, the difference amplifier 40 is on the threshold of having an output signal of sufficient amplitude to energize the output amplifier 80 which in turn will energize relay 90. The first threshold level may be established by closing the switch 73, thereby connecting resistor 72 in parallel with resistor 65, which partially controls the D.C. biasing current supplied to the magnetometer 20. The value of the resistor 72 is preferably approximately ten times the value of resistor 65, so that additional biasing current (above the biasing current necessary to have established the ambient operating point, as described previously) in the amount of approximately ten percent of the original biasing current is caused to flow through the output windings 24 and 25 of the magnetometer. As a result of the increase in D.C. biasing current, the ambient operating point of the magnetometer is shifted to the left from the line 66, as seen in FIG. 10. A first threshold level is established which now requires any perturbation in the earth's magnetic field, as detected by the magnetometer 20, to exceed this first threshold level before the output signal from the magnetometer is of sufficient amplitude, as compared to the reference signal by the difference amplifier 40, to cause an output signal from the difference amplifier 40 to energize the output amplifier 80 and in turn relay coil 58.

The second and lower threshold level may then be established whenever the output signal of the magnetometer 20 is of sufficient amplitude to rise above the first threshold level. Assuming that such a signal does appear, the difference amplifier 40 will provide an output signal which will be amplified by output amplifier 80. The output of amplifier 80 will energize the relay 90, which will open normally closed contacts 90a and will close normally open contacts 90b and 90c. When the contacts 90a open, the resistor 71, which was previously shorted out, will now be serially connected with the resistor 72, so that the total resistance paralleling the resistor 65 is increased. This in turn results in a reduction in the flow of biasing current supplied to the output windings of magnetometer 20. By making the value of the resistor 71 approximately equal to that of resistor 72, the additional biasing current that established the first threshold level may be reduced by approximately fifty percent. This moves the operating point of the magnetometer to the right, as seen in FIG. 10 and increases the amplitude of the output signal produced in response to a given magnetic field perturbation. Thus, the output signal from difference amplifier 40 will continue to be amplified and energize relay 90 until the output signal from the magnetometer drops below the second threshold level.

The reason for establishing a first threshold level and a second lower threshold level may be best understood from FIG. 12, which constitutes a graphical illustration of typical electrical signals supplied to the difference amplifier from the magnetometer. In FIG. 12, the waveform 75 represents a first vehicle passing the magnetometer, while the waveform 75′ represents another conventional vehicle having a different distribution of magnetically permeable materials passing the magnetometer. A first upper threshold value is illustrated by dashed line 76 so that as the waveform 75 rises from the ambient level, the difference amplifier 40 (FIG. 11) first provides a signal at the intersection 77, which is amplified and energizes the relay 90. Once relay 90 is energized, contacts 90a, which were previously closed, are now opened, whereby the second threshold is established, as indicated by dashed line 78. The establishment of such a lower threshold prevents intermediate fluctuations of waveform 75 from affecting the operation of the circuit, because the difference amplifier continues to provide a signal to keep relay 90 energized and contacts 90a open until the waveform drops below the second threshold value at the intersection point 74. By this means, a single positive registration of the passing of a single vehicle is provided even though the waveform produced by the passing of said vehicle may fluctuate at a level above the ambient level. In a similar fashion, but with a different configuration of amplitude variations, a waveform 75′ appearing at difference amplifier causes the relay to be actuated at the intersection point 77′ with the first upper threshold 76, with the relay remaining energized until the waveform drops below the second lower threshold 77 at the intersection point 74′.

The accuracy of the system is further enhanced because both threshold levels are proportionately set from the initial D.C. level which defines the ambient operating point by adjusting potentiometer 64 so that sufficient D.C. biasing current is supplied to the magnetometer 20 to counteract the local effect of the earth's ambient magnetic field, which may vary at different points on the earth's surface as previously described. Thus, any fluctuation in the ambient operating point will be proportionately reflected in the threshold levels, thereby maintaining relative stability between the ambient operating point and the two threshold levels.

In accordance with a further feature of the invention, a capacitor 91 may be connected across the coil of the relay 90 so as to render the relay insensitive to minor excursions of the output signal from the magnetometer below the lower threshold level. Such minor excursions may be caused by momentary interruptions in the signal due to extraneous effects or to sharply defined areas of irregular distribution of magnetically permeable materials in a vehicle. The operation of the circuit is such that the capacitor 91 is rapidly charged by the output signal from output amplifier 80, but discharges slowly through the relatively high resistance of the coil of relay 90.

As previously noted, the relay 90 is provided with two sets of normally open contacts 90b and 90c. These may be utilized in various ways, only two of which are shown in FIGS. 9 and 11 as illustrative. For example, a conventional electronic counter 92 may be connected between the contacts 90b to register a count each time the contacts are closed. Thus, the counter can total the number of vehicles passing adjacent the magnetometer over a desired time interval. Likewise, a conventional indicator light 93 may be connected in series with a battery 94 between the contacts 90c to provide a visual indication of the passing of each vehicle. The indicator means, such as the counter 92 or light 93, may be, and probably would be, located remotely from the remainder of the apparatus.

Although the relay 90 has been shown and described as being energized from the output of the amplifier 80, it will be apparent to one skilled in the art that other utilization means may be used. For example, the apparatus of the invention might provide signals to a computer at a remote location, which is controlling traffic signals over a wide area.

It is apparent to one skilled in the art that the preceding description is only one example of means for practicing the teachings of the invention and is in no way intended to limit the invention. Similarly, the following table of some circuit parameters is given for exemplary purposes only:

| Component | Value |
| --- | --- |
| Transistors 41, 42 | 2N388 |
| Zener diode 63 | 1N752 |
| Diodes 53, 53', 54, 54' | 1N276 |
| Capacitors 52, 52', 55, 55' microfarad | .01 |
| Variable resistor 51 ohms | 5000 |
| Variable resistor 64 do | 500 |
| Fixed resistor 61 do | 220 |
| Fixed resistor 62 do | 11 |
| Fixed resistors 43, 44 and 65 do | 1000 |
| Fixed resistors 56 and 56' do | 100,000 |
| Fixed resistors 71 and 72 do | 10,000 |

An alternative arrangement for practicing the invention, wherein not all of the stabilization circuits of FIG. 11 are considered to be necessary, is shown in FIG. 13, in which parts similar in function to those of FIG. 11 have designated by corresponding primed reference characters. In FIG. 13, the establishment of a threshold level is provided by direct application of reference signals to the difference amplifier 40'. These signals are derived from a voltage divider comprising resistors 81, 82, and 83 which are connected between a suitable D.C. source and ground. The output from the difference amplifier 40' energizes the coil of a relay 90, which functions to operate the contacts 90a', 90b' in a manner somewhat similar to that shown in FIG. 11. However, in FIG. 13 the contacts 90a' comprise essentially a single-pole double-throw switch so that a back contact connection is made when the relay coil is energized. This means that the connection of the reference level input to the differential amplifier 40' is switched from the junction point between the resistors 81 and 82 to a junction point between the resistors 82 and 83. The result is that the voltage level applied to the reference input of the difference amplifier 40' is lowered in response to the actuation of the relay 90'. Again, a capacitor 91' may be placed across the relay coil to render the circuit insensitive to minor excursions below the threshold value. By applying a signal from a suitable magnetic field sensing element to the signal input lead of the difference amplifier 40', an operation may be achieved corresponding to that shown in FIG. 12 and previously described, in which a first upper threshold value is established with a second lower threshold value being established whenever an input signal rises above the first upper threshold value, and with the second lower threshold value obtaining until the input signal drops below the second lower threshold value. As in FIG. 11, the apparatus shown in FIG. 13 may be connected at its output terminals to a suitable indicator lamp, counter, or other indicator means.

By way of example only, one suitable type of magnetometer sensing element for use in accordance with the invention is illustrated in FIGS. 14 and 15. In FIGS. 14 and 15, a single magnetometer sensing element 20 is shown, which comprises a magnetically permeable strip 21 of a saturable material such as for example, molybdenum permalloy alloy 4–79, having dimensions of the order of .001 inch by .062 inch. The strip is spirally wrapped inside a length of ceramic tubing 85 constructed of a material capable of withstanding temperatures of 2500° F. The strip may have, for example, an inside diameter of .04 inch and an outside diameter of .06 inch and be approximately 1.5 inches in length. The assembly may be hydrogen-annealed according to conventional methods for the particular strip material involved, and after annealing the ceramic tube may then be used directly in the assembly.

Wound about the ceramic tube 85 are the energizing coils 22 and 23, and wound on top of the energizing coils are the output windings 24 and 25. Each of the energizing coils may consist of two double layer coils of No. 38 wire, ¼ inch long, with 104 turns for each winding, spaced 3/16 inch apart. As noted previously, the energizing coils 22 and 23 are reverse connected so as to produce an opposite magnetization effect upon the saturable strip 21. After the coils are assembled on the support tube 85, the ends of the tubing may be capped with a suitable sealer to render the over-all structure impervious to moisture. The resultant structure will withstand thermal and physical shocks without damaging the magnetic properties of the saturable strip. The coils 22, 23, 24 and 25 may be connected as shown in FIGS. 9 and 11, with the magnetometer being aligned along its axis with the earth's magnetic field lines as shown in FIG. 7 or FIG. 8.

With the above-described construction for the flux gate magnetometer, a suitable energization frequency, which may be provided by the oscillator 26 of FIG. 9, is 65 kilocycles.

FIG. 16 shows an alternative arrangement of a magnetometer sensing element for use in accordance with the present invention, in which a magnetically permeable element 86 is magnetically coupled to the saturable strip 21. The magnetically permeable element 86 functions to gather and collect magnetic fields in an adjacent area. By a suitable selection of one or more auxiliary magnetically permeable elements to be used in conjunction with a magnetometer sensing unit in accordance with the invention, a particular flux collecting aperture of a desired size and shape may be established. As noted previously, in accordance with the practice of the invention, the magnetometer may be positioned so that the flux collecting aperture provides an area on a plane transverse of the earth's ambient magnetic field within which the average flux denisty at a given distance from a vehicle path does not fall below the ambient value. By using auxiliary magnetically permeable flux collecting elements, as shown in FIG. 16, the effective flux collecting aperture of the magnetometer sensing element may be enlarged so that the corresponding area on a given plane transverse to the earth's ambient field is enlarged. The result is that the magnetometer sensing element may be placed somewhat closer to the vehicle path than would otherwise be possible, yet maintaining the relationship which enables the present invention to provide signals representing passing automotive vehicles. As may be expected, through the use of magnetic flux collecting elements and by a closer positioning of the magnetometer relative to the vehicle path, an increased output signal may be obtained. Moreover, the shape of the flux collecting aperture may be selected in accordance with the invention to be greater in dimension in the direction of travel along a roadway. This enhances the averaging of the flux density in the desired direction while minimizing the effects produced by vehicles passing in adjacent lanes. The particular arrangement of FIG. 16 is suitable for this purpose when the element 86 is properly oriented along the direction of vehicle travel. It should be noted that where the magnetic field sensing element is suspended above the roadway a greater distance between the vehicle path and the sensing element may be desirable than where the magnetic sensing element is placed below the surface of the ground. Therefore, in overhead installations, auxiliary magnetic field collecting elements may be employed to control the flux collecting aperture as desired.

Another way of practicing the invention is represented in FIG. 17 wherein a container 95, housing the magnetic field sensing element 20 and all of its associated circuitry previously described (except for the relay 90 and the indicator means) is shown positioned beneath the earth's surface 10. The circuitry is indicated generally by the numeral 96. The container is preferably fabricated of non-ferrous material, such as aluminum or plastic, and has a cylindrical shape. The cylindrical container is positioned with its axis perpendicular to the path of vehicular traffic, and the circular top of the container is located just below the earth's surface. Experiments indicate that a cylindrical housing 20 inches in length and 1 inch in diameter is sufficient in size to house all necessary components. It is preferable to mount the magnetic field sensing element 20 at the bottom of the container, as shown in FIG. 13, with its axis parallel to the container axis. Thus, the distance of the magnetometer element from the earth's surface is conveniently controlled and made uniform for all installations. Further, all semiconductor components, such as diodes 53, 54, 53', 54', Zener diode 63, and transistors 41 and 42 (FIG. 11), are preferably mounted at the bottom of the container in order to more evenly maintain their temperature environment. The container 95, which is hermetically sealed to prevent moisture from entering the interior, is furnished with a multi-lead cable 97 which connects the circuitry 96 within the container of the relay 90 and indicator means, which may be located as desired. The leads in the cable 97 also serve as power leads for supplying the circuitry with the required D.C. operating potential from a remotely located power source, and as test leads to enable remote monitoring of the electronic performance of the circuit.

Summarizing briefly, the appearance of a vehicle produces perturbation in the earth's magnetic field which are sensed by a magnetometer, which is positioned in a particular location to sense the average flux density appearing within a given area on a predetermined plane transverse to the earth's ambient magnetic lines of force. Effects of varying output signals of the magnetometer due to varying operating conditions of its energizing means are minimized by establishing a D.C. biasing current through the magnetometer's windings, thereby shifting the ambient operating point of the magnetometer to a more favorable position. This bias further aids the over-all performance of the magnetometer by shifting its ambient operating point to a point where a larger output signal is obtained from the magnetometer for a given change in magnetic field intensity.

A first threshold level may be established so that perturbation of the earth's magnetic field has to exceed a predetermined value before indicator means can be energized. A second threshold level, lower than the first threshold level but above the ambient operating level, may be established, whereby the indicator means, once energized, continue to be energized until the perturbation of the earth's magnetic field falls below a predetermined second value, both threshold levels being proportionately set from the D.C. biasing source which defines the ambient operating point. The system is further enhanced by using a portion of the output signal of the magnetometer's energizing means as a reference signal for a difference amplifier which amplifies the magnetometer output signal, thereby further compensating for any changes in the magnetometer's operating conditions.

Although there has been described the manner in which the method of the applicant's invention may be employed to provide sensing of automotive vehicles either passing by a given location or at best in a given location, and there have been described various systems and apparatus for practicing the method of the invention, pursuant to which a magnetometer may be stabilized for various operating conditions and in which thresholds of operation may be established which are altered in response to signals to provide reliable and positive operation, and wherein auxiliary flux collecting elements may be employed in conjunction with magnetometer sensing elements to establish a predetermined flux collecting aperture, it will be appreciated that the particular described methods and apparatus are given by way of example only of the manner in which the present invention may be successfully practiced. It will be appreciated that various modifications and variations in both the steps of the method and the illustrative structures may be readily made to adapt the system to particular circumstances of operation. Accordingly, the invention should be considered to encompass any and all alternative arrangements, modifications, variations and equivalent methods and structures falling within the scope of the annexed claims.

The embodiments of the invention in which an exclusive property or privilege is claimed are defined as follows:

1. In a system for detecting the presence of a vehicle, comprised of spaced first and second masses of magnetically permeable material, at any position between first and second positions on a path circumscribing at least a portion of the earth's surface, the combination of:
   first means defining a sampling area and including means providing a signal responsive to magnetic field intensity variations from an ambient level within said area;
   means supporting said first means at a specified distance from said path so that said magnetic field intensity within said area will vary in a first direction only from said ambient level for all positions of said vehicle between said first and second positions whereat said first and second masses respectively bear substantially the same physical relationship with respect to said first means; and
   means coupled to said first means and responsive to said signal for registering the presence of said vehicle.

2. The system defined in claim 1 wherein said first means comprises:
   a hollow cylindrical member;
   a saturable magnetic thin strip rolled against the inside of said cylindrical member;
   a pair of oppositely wound input windings wound on the exterior of said cylindrical member; and
   a pair of like wound output windings wound about the exterior of said cylindrical member outside the input windings.

3. The system of claim 1 wherein said means supporting said first means includes an elongated housing having spaced first and second ends;
   means positioning said housing substantially perpendicular to said path and said second end substantially flush with said path;
   said housing being of a length such that the spacing between said first and second ends is substantially equal to said specified distance.

4. The system defined in claim 1 in which said first means comprises a flux gate magnetometer.

5. The system defined in claim 4 including at least one magnetically permeable element coupled to said flux gate magnetometer for establishing a predetermined flux collecting aperture.

6. The system defined in claim 5 in which said magnetically permeable element is adapted to establish a flux collecting aperture for said magnetometer having a shape which is greater in dimension along one direction than along a transverse direction.

7. The system defined in claim 6 in which said magnetically permeable element is oriented with respect to said path such that the greater dimension of said flux collecting aperture is in the direction of said path.

8. In a system for analyzing the flow of vehicular traffic along a path circumscribing at least a portion of the earth's surface the combination of:
    magnetic field sensing means positioned at a predetermined distance from said path at which the effect of the passage of a vehicle along said path produces variations in the earth's magnetic field intensity, only the first and last intensity variations falling below the ambient intensity of said field obtaining in the absence of a vehicle;
    a threshold circuit coupled to said magnetic field sensing means; and
    a circuit coupled to said threshold circuit which is actuated in response to individual vehicles passing along said path;
    said threshold circuit including means establishing a first predetermined threshold level of operation; and
    means responsive to the appearance of a signal in excess of said first predetermined threshold level for lowering said threshold level of operation to a second predetermined level less than said first predetermined level.

9. In a system for analyzing the flow of vehicular traffic along a path circumscribing at least a portion of the earth's surface the combination of:
    a flux gate magnetometer positioned at a predetermined distance from said path, said flux gate magnetometer having a given flux collecting aperture, said flux gate magnetometer being positioned so that said flux collecting aperture encompasses an area on a plane transverse to the ambient earth's magnetic field lines and at which the value of the average flux density passing through said given area during the passage of a vehicle falls not more than twice below the ambient flux density value passing through said area in the absence of a vehicle, said flux gate magnetometer further being aligned with the magnetic field lines produced by the earth's ambient magnetic field in the absence of a vehicle;
    means biasing said flux gate magnetometer to establish a first predetermined threshold of operations;
    means responsive to an output signal from said flux gate magnetometer for altering the bias on said magnetometer to establish a second predetermined threshold value lower than said first predetermined threshold value; and
    signal registering means coupled to said magnetometer for registering a single count for every perturbation in the earth's magnetic field rising above said first predetermined threshold value and subsequently falling below said second predetermined threshold value.

10. A system for analyzing the flow of vehicular traffic along a path circumscribing at least a portion of the earth's surface comprising:
    magnetic field sensing means for positioning at a distance from said path for providing an electrical signal having amplitudes proportional to varying intensities of the earth's magnetic field caused by a passing vehicle;
    electrical oscillator means for providing a signal of predetermined amplitude to energize said magnetic field sensing means;
    biasing means for biasing said magnetic field sensing means to establish a first operating point wherein the amplitude of the electrical signal provided by said magnetic field sensing means in the absence of a passing vehicle is substantially equal to a predetermined portion of the amplitude of the signal provided by said electrical oscillator means;
    threshold means for further biasing said magnetic field sensing means to establish a first threshold level wherein the amplitude variations in the earth's magnetic field caused by a passing vehicle must be at least equal to a predetermined level for said magnetic field sensing means to provide proportional signals having amplitudes which are substantially equal to or greater than said predetermined portion of the amplitude of the signal provided by said electrical oscillator means;
    difference means energized by signals from said electrical oscillator means and said magnetic field sensing means for providing an output signal only when the energizing signal from said magnetic field sensing means is substantially at least equal to the signal from said electrical oscillator means, said difference means further energizing said threshold means to establish a second predetermined threshold level of operation lower than said first threshold level of operation; and
    signal registering means energized by the output signal of said difference means for registering a single count for every signal of said magnetic field sensing means proportional to an amplitude variation in the earth's magnetic field in response to the passage of a vehicle being at least equal to said first threshold level of operation and subsequently falling below said second threshold level of operation.

11. A system for analyzing the flow of vehicular traffic along a path circumscribing at least a portion of the earth's surface comprising:
    magnetic field sensing means adapted to be positioned at a distance from said path for detecting intensity variations in the earth's magnetic field caused by a passing vehicle, said magnetic field sensing means providing an output signal having amplitude variations proportional to said detected intensity variations in the earth's magnetic field;
    electrical oscillator means for providing a signal of a predetermined substantially constant amplitude to energize said magnetic field sensing means;
    signal reference means for providing a reference signal having a substantially constant amplitude;
    difference means energized by said output signal of said magnetic field sensing means and by said reference signal for comparing said signals and providing an output signal only when the amplitude of said output signal of said magnetic field sensing means is at least equal to the predetermined amplitude of said reference signal; and
    signal registering means coupled to said difference means for registering a single count for every output signal of said difference means, each count substantially representing the passage of a single vehicle along said path.

12. The system defined in claim 11 wherein said magnetic field sensing means comprises:
    a hollow cylindrical member;
    a saturable magnetic thin strip rolled against the inside of said cylindrical member;
    a pair of oppositely wound input windings wound on the exterior of said cylindrical member; and
    a pair of like wound output windings wound about the exterior of said cylindrical member outside the input windings.

13. The system defined in claim 11 wherein said electrical oscillator means energizes said signal reference means thus providing a predetermined portion of the signal of said electrical oscillator means as said reference signal.

14. The system defined in claim 11 further comprising:
    stabilizing means for biasing said magnetic field sensing means to establish a first operating point at which the amplitude of the output signal of said magnetic field sensing means proportional to the detected earth's magnetic field intensity in the absence of a passing vehicle is substantially equal to the amplitude of said reference signal.

15. The system defined in claim 11 further comprising: threshold means for biasing said magnetic field sensing means to establish a first threshold level of operation at which the amplitude of the output signal of the magnetic field sensing means proportional to the intensity variations of the earth's magnetic field caused by the passage of a vehicle is at least equal to the amplitude of said reference signal.

16. The system defined in claim 15 including means for establishing said first threshold level as a function of the intensity of the earth's magnetic field.

17. The system defined in claim 15 in which said threshold means is further responsive to the output signal of said difference means for lowering said first threshold level of operation to a second threshold level lower than said first threshold level of operation.

18. The system defined in claim 17 including means for establishing said first and second threshold levels as different functions of the intensity of the earth's magnetic field.

19. A system for analyzing the flow of vehicular traffic along a path circumscribing at least a portion of the earth's surface comprising:
    magnetic field sensing means positioned at a distance from said path for detecting intensity variations in the earth's magnetic field caused by a passing vehicle and providing an output signal having amplitude variations proportional to said detected magnetic intensity variations in the earth's magnetic field, not more than two amplitudes of said output signal falling below the amplitude of a signal proportional to a detected earth's magnetic field intensity in the absence of a passing vehicle;
    oscillator means for providing a signal of a predetermined amplitude to energize said magnetic field sensing means;
    first detector means energized by the output signal of said magnetic field sensing means for converting it to a proportional first direct current signal;
    second detector means energized by a preselected portion of the signal of said oscillator means for converting it to a direct current reference signal;
    difference means energized by said first and said reference direct current signals for comparing said signals and providing an output signal only when said first direct current signal is at least equal to said second direct current signal; and
    signal registering means coupled to said difference means for registering a single count for every output signal of said difference means, each count substantially representing the passage of a single vehicle along said path, the vehicle varying the intensity of the earth's magnetic field as detected by said magnetic field sensing means so that the amplitude of the output signal of said magnetic field sensing means is sufficient to produce a first direct current signal in said first detector means having an amplitude at least equal to said direct current reference signal.

20. The system as defined in claim 19 further comprising:
    stabilizing mean for biasing said magnetic field sensing means to establish a first operating point at which the amplitude of the output signal of said magnetic field sensing means proportional to the detected earth's magnetic field intensity in the absence of a passing vehicle is substantially equal to the amplitude of said reference signal; and
    threshold means for further biasing said magnetic field sensing means to establish a first threshold level of operation at which the amplitude of the output signal of the magnetic field sensing means proportional to the intensity variations of the earth's magnetic field caused by the passage of a vehicle is at least equal to the amplitude of said reference signal, the threshold means being further responsive to the output signal of said difference means for lowering said threshold level of operation to a second threshold level lower than said first threshold level of operation.

21. The system defined in claim 20 in which said magnetic field sensing means comprises a flux gate magnetometer having its response axis substantially aligned with the earth's ambient magnetic field lines of flux in the absence of the passage of a vehicle along said path.

22. The system defined in claim 21 in which said flux gate magnetometer further includes a flux collecting aperture established by at least one magnetically permeable element coupled to said flux gate magnetometer, said flux collecting aperture being positioned at a predetermined distance from said path encompassing an area on a plane transverse to the earth's ambient magnetic field at which the average value of the magnetic field intensity within said area during passage of a vehicle along said path is never substantially less than the value of the earth's ambient magnetic field intensity through said area in the absence of said passing vehicle, said magnetically permeable element having a shape which is greater in dimension along one direction than along a transvers direction, the greater dimension of said aperture being oriented along the direction of vehicular traffic along said path.

23. A system for analyzing intensity variations of a magnetic field having a predetermined intensity comprising:
    magnetic field sensing means for detecting magnetic intensity variations of said magnetic field and providing an output signal having amplitude variations proportional to the detected magnetic intensity variations of said magnetic field;
    energizing means for providing a signal of a predetermined amplitude to energize said magnetic field sensing means;
    signal reference means for providing a reference signal having a predetermined amplitude;
    difference means energized by said output signal of said magnetic field sensing means and by said reference signal for comparing said signals and providing an output signal only when the amplitude of said output signal of said magnetic field sensing means is at least equal to the predetermined amplitude of said reference signal;
    biasing means for biasing said magnetic field sensing means to establish a first threshold level of operation at which the amplitude of the output signal of said magnetic field sensing means proportional to a preselected magnetic field intensity of said magnetic field is equal to or greater than the amplitude of said reference signal; and
    signal registering means coupled to said difference means for registering a single count for every output signal of said difference means, each count substantially indicating an intensity of said magnetic field at least equal to said preselected magnetic field intensity.

24. A system for detecting variations in intensity of earth's magnetic field caused by the presence of magnetically permeable material non-uniformily distributed, comprising:
    magnetic field sensing means for providing signals having amplitudes proportional to detected intensities of the earth's magnetic field;
    threshold means coupled to said magnetic field sensing means for establishing a first threshold level and a second threshold level lower than said first threshold level; and indicating means coupled to said threshold means for providing an indication when the amplitudes of said signals provided by said magnetic field sensing means exceed said first threshold level and subsequently fall below said second threshold level.

25. The system defined by claim 24 further including:

biasing means connected to said magnetic field sensing means for establishing a magnetic field thereacross in opposition to the earth's ambient magnetic field.

26. The system defined in claim 24 wherein said magnetic field sensing means comprises:

a hollow cylindrical member;

a saturable magnetic thin strip rolled against the inside of said cylindrical member;

a pair of oppositely wound input windings wound on the exterior of said cylindrical member; and a pair of like wound output windings wound about the exterior of said cylindrical member outside the input windings.

27. In a system for counting vehicles moving along a path circumscribing at least a portion of the earth's surface wherein said vehicles are comprised of spaced first and second masses of magnetically permeable material, the combination of:

first means defining a sampling area and including means providing a signal responsive to magnetic field intensity variations from an ambient level within said area;

means supporting said first means at a specified distance from said path so that movement of one of said vehicles therepast will cause said magnetic field intensity within said area to vary in a first direction only from said ambient level for all positions of said vehicle between first and second positions whereat said first and second masses respectively bear substantially the same physical relationship with respect to said first means; and means responsive to said signal for registering the movement of said vehicle past said first means.

28. In a system for counting vehicles moving along a path circumscribing at least a portion of the earth's surface wherein said vehicles are comprised of spaced first and second masses of magnetically permeable material, the combination of:

first means defining a sampling area and including means for providing a signal whose amplitude varies from an ambient level substantially proportionally to magnetic field intensity variations from an ambient level within said area;

means supporting said first means at a specified distance from said path so that movement of one of said vehicles therepast will cause said magnetic field intensity within said area to vary in a first direction only from said ambient level for all positions of said vehicle between first and second positions whereat said first and second masses respectively bear substantially the same physical relationship with respect to said first means; and means coupled to said first means for registering a single count in response to said signal amplitude varying in a first direction from and returning to said ambient level.

29. The system defined in claim 28 wherein said first means comprises:

a hollow cylindrical member;

a saturable magnetic thin strip rolled against the inside of said cylindrical member;

a pair of oppositely wound input windings wound on the exterior of said cylindrical member; and a pair of like wound output windings wound about the exterior of said cylindrical member outside the input windings.

30. In a system for counting vehicles, each comprised of spaced first and second masses of magnetically permeable material, on a path circumscribing at least a portion of the earth's surface, the combination of:

first means defining a sampling area and including means for providing a signal whose amplitude is substantially proportional to magnetic field intensity within said area;

means supporting said first means adjacent said path; and means coupled to said first means and responsive solely to said signal for registering a single count for each different vehicle on said path altering the magnetic field intensity within said area.

31. A method of using a detector defining a sampling area and providing a signal whose amplitude is substantially proportional to magnetic field intensity within said sampling area for indicating the presence of a vehicle, comprised of spaced first and second masses of magnetically permeable material at different locations, on a path circumscribing at least a portion of the earth's surface, said method comprising the steps of:

positioning said detector at a distance from said path whereat a vehicle on said path will vary the magnetic field intensity at each of said different locations within said sampling area in a first direction from an ambient level; and indicating the presence of a vehicle each time said signal varies in a first direction.

32. A method of using a detector providing a signal whose amplitude is substantially proportional to magnetic field intensity for indicating the presence of a vehicle, comprised of spaced first and second masses of magnetically permeable material, at any position of said vehicle between first and second positions on a path which path circumscribes at least a portion of the earth's surface, said method comprising the steps of:

positioning said detector at a position relative to said path whereat the presence of a vehicle at any position of said vehicle in close proximity to said detector position increases the magnetic field intensity at said detector position from an ambient field intensity level existing thereat in the absence of said vehicle; and indicating the presence of a vehicle in response to the amplitude of said signal exceeding the amplitude of said signal in the absence of said vehicle.

33. A method of using a detector providing a signal whose amplitude is substantially proportional to magnetic field intensity for indicating the movement of a vehicle between first and second locations on a path circumscribing at least a portion of the earth's surface, said method comprising the steps of:

positioning said detector at a position relative to said path whereat the movement of a vehicle between said first and second locations on said path, each such location being in close proximity to said position, will successively cause initial, intermediate and ultimate magnetic field intensity levels to be established at said position all of which levels other than said ultimate level exceed the intensity level in the absence of a vehicle; and registering a single count for each series of intensity levels all of which exceed said intensity level in the absence of a vehicle.

34. A method of using a detector providing a signal whose amplitude is substantially proportional to magnetic field intensity for indicating the movement of a vehicle between first and second locations on a path circumscribing at least a portion of the earth's surface, said method comprising the steps of:

positioning said detector at a position relative to said path whereat the movement of a vehicle between said first and second locations on said path, each such location being in close proximity to said position, will successively cause initial, intermediate and ultimate magnetic field intensity levels to be established at said position all of which levels other than said ultimate level exceed the intensity level in the absence of a vehicle; and registering a single count each time the amplitude of said signal rises above and subsequently falls below the amplitude of said signal in the absence of a vehicle.

References Cited by the Examiner

UNITED STATES PATENTS

| | | |
|---|---|---|
| 2,066,211 | 12/1936 | McCreary. |
| 2,916,696 | 12/1959 | Schonstedt _____ 324—43 |
| 2,996,663 | 8/1961 | Ferguson _____ 324—43 |
| 3,126,522 | 3/1964 | Fiesser _____ 340—39 |

NEIL C. READ, *Primary Examiner.*

R. M. ANGUS, *Assistant Examiner.*